United States Patent [19]

Sumikawa et al.

[11] 4,265,395
[45] May 5, 1981

[54] TEMPERATURE CONTROL APPARATUS FOR AN AUTOMOBILE AIR CONDITIONER

[75] Inventors: Seizi Sumikawa, Namekawa; Takesi Harada, Higashimatsuyama, both of Japan

[73] Assignee: Diesel Kiki Co., Ltd., Tokyo, Japan

[21] Appl. No.: 96,201

[22] Filed: Nov. 20, 1979

[30] Foreign Application Priority Data

Nov. 20, 1978 [JP] Japan ............................. 53-142172

[51] Int. Cl.³ .................. G05D 23/00; G06F 7/38
[52] U.S. Cl. ................................. 236/13; 73/432 A; 165/11 R; 236/51; 236/94; 235/92 EV
[58] Field of Search .............. 165/11; 236/94, 13, 236/51; 62/126, 127; 219/506; 324/417; 73/432 A; 340/187; 235/92 EV

[56] References Cited

U.S. PATENT DOCUMENTS

| | | | |
|---|---|---|---|
| 2,645,945 | 7/1953 | Homkes | 62/164 X |
| 3,534,335 | 10/1970 | Hogan et al. | 340/187 X |
| 4,024,767 | 5/1977 | Kampf | 236/94 |
| 4,192,993 | 3/1980 | Wechsler | 235/92 EV |

Primary Examiner—William E. Wayner
Attorney, Agent, or Firm—Birch, Stewart, Kolasch & Birch

[57] ABSTRACT

Disclosed is a temperature control apparatus for an air conditioner of an automobile. This temperature control apparatus comprises a push button switch for elevating the set temperature and a push button switch for lowering the set temperature.

Every time the push button switch for elevating the set temperature is depressed, the set temperature can be elevated by, for example, 1° C. On the other hand, every time the push button switch for lowering the set temperature is depressed, the set temperature can be lowered by, for example, 1° C. Accordingly, the temperature can easily be set at an optional level by operating these switches appropriately. The so set temperature is digitally and visually displayed very clearly by a digital indicator.

10 Claims, 4 Drawing Figures

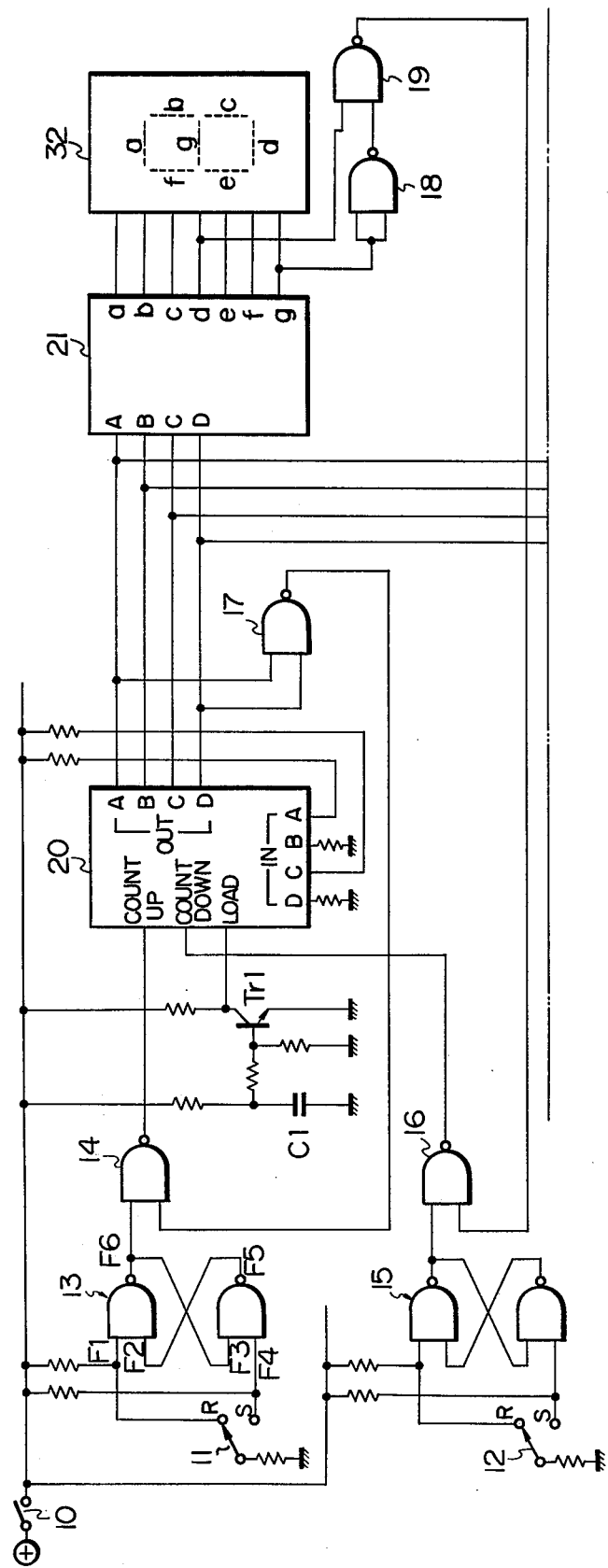

TEMPERATURE CONTROL APPARATUS FOR AN AUTOMOBILE AIR CONDITIONER

BACKGROUND OF THE INVENTION

(1) Field of the Invention

The present invention relates to a temperature control apparatus for controlling air temperature in an automobile air conditioner, and particularly, relates to an apparatus for setting the air temperature at a predetermined level.

(2) Brief Description of the Prior Art

In the conventional temperature control apparatus of an automobile air conditioner, the temperature is set by operating a sliding-type lever and the level of the set temperature is ordinarily displayed (analog display) depending on the position of the lever. Accordingly, the appearance of the conventional temperature control apparatus is not aesthetically attractive and the actual level of the set temperature is not specifically displayed.

SUMMARY OF THE INVENTION

It is an object of the present invention to provide a temperature control apparatus for an automobile air conditioner in which the temperature can be set by a very simple operation, the actual level of the set temperature can easily be known and appearance is very attractive.

For attaining this object, according to the present invention, a manual operating means is constructed by two push button switches for elevating and lowering the set temperature, respectively, so that the set temperature is elevated or lowered, for example, 1° C. every time one of these push button switches is depressed and the set temperature is digitally and visually displayed on an instrument panel or the like.

DETAILED DESCRIPTION OF THE PREFERRED EMBODIMENT

Figure 1:
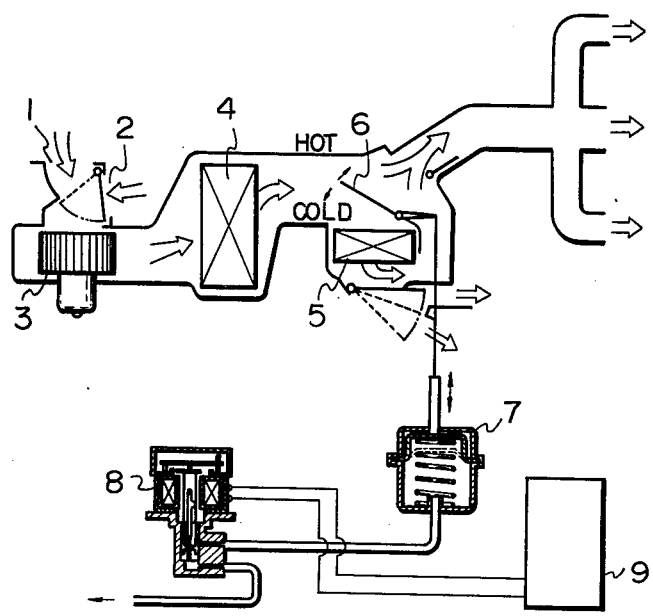
FIG. 1 is a sectional view diagrammatically illustrating one embodiment of the temperature control apparatus according to the present invention.

Referring to FIG. 1, reference numerals 1, 2, 3, 4, 5 and 6 represent an outer air introducing opening, an inner air introducing opening, a fan, an evaporator of a cooler, a heater core and an air mixing door, respectively.

The air mixing door 6 is connected to a negative pressure actuator (power servo) 7 through a link and a negative pressure is introduced into the negative pressure actuator 7 from a negative pressure source through a transducer 8. The transducer 8 is arranged so that an electric signal is put into the transducer 8 from a control amplifier 9 disposed to receive signals from a temperature setting circuit and a temperature detecting circuit and compare both signals with each other.

More specifically, when the output current of the control amplifier 9 is reduced, the force balance in the transducer 8 is put into disorder and a negative pressure hole is opened to increase the output of the negative pressure (control negative pressure). This negative pressure acts on a diaphragm of the negative pressure actuator 7 to draw the air mixing door 6 by the link, with a result that the quantity of air passing through the heater core 5 is increased and the temperature in the car chamber is elevated. Incidentally, the heater core 5 is arranged so that when the air mixing door 6 is opened beyond a predetermined value, the heater core 5 becomes ON and actuates.

When the output current of the control amplifier 9 is increased, an air hole in the transducer 8 is opened and the output of the negative pressure is reduced. The resulting negative pressure actuates the negative pressure actuator 7 and air mixing door 6 to perform operations reverse to those described above, with a result that the quantity of air passing through the heater core 5 is reduced and the temperature in the car chamber is lowered.

Figure 2:
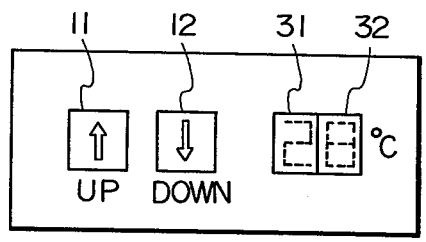
FIG. 2 is an outside view illustrating the manual operating means for setting the temperature of the embodiment shown in FIG. 1, and FIG. 3 (3A and 3B) is a diagram illustrating a control circuit of the embodiment shown in FIG. 1.

The manual operating means for setting the temperature of the temperature control apparatus according to the present invention is shown in FIG. 2. This manual operating means is built into an instrument panel or the like and comprises two juxtaposed self-return type push button switches 11 and 12 for elevating and lowering the set temperature (up-switch and down-switch), an indicator 31 consisting of LEDs or fluorecent display tubes for always indicating a numerical value of 2 and another indicator 32 for indicating one of numerical values of 0 to 9 by 7 segments. Set temperature of from 20° to 29° C. can be digitally displayed by these indicators 31 and 32.

Figure 3B:
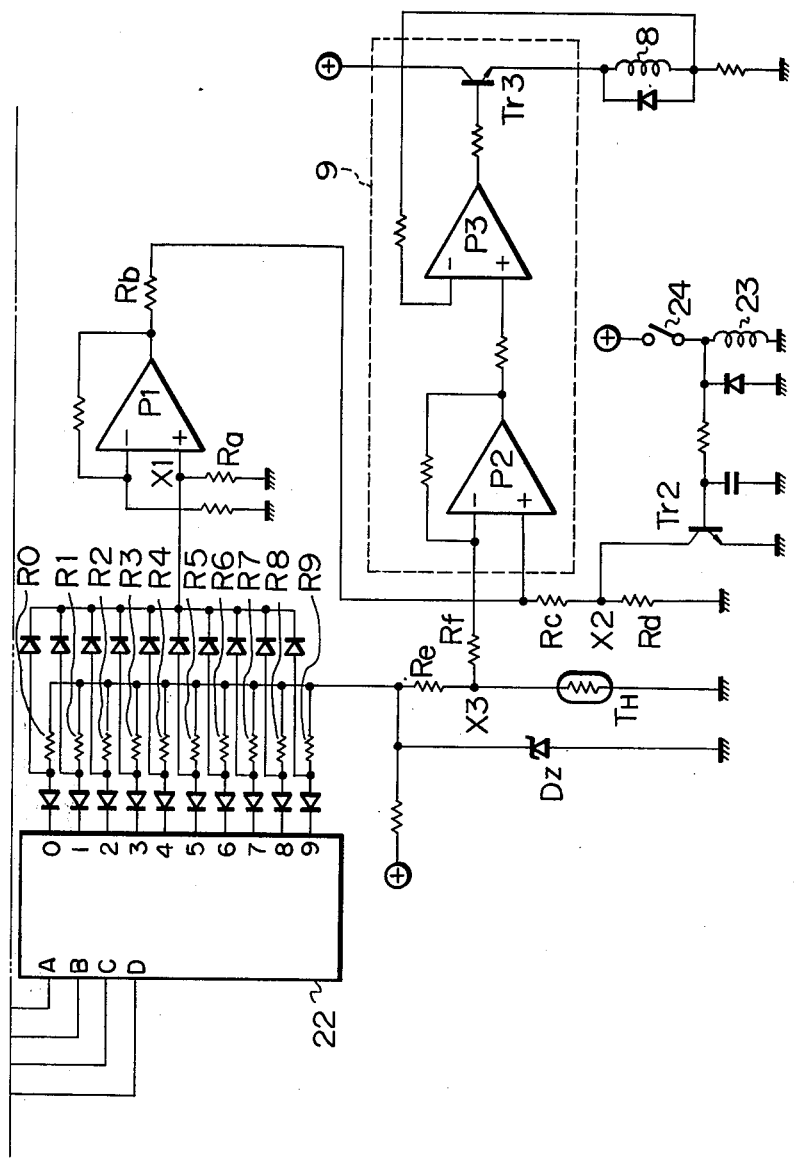

In FIG. 3, reference numerals 10, 11 and 12 represent a power source switch of the air conditioner, the above-mentioned up-switch and down-switch, respectively. When the up-switch 11 is depressed (contact S is closed) while the power source switch 10 is closed, logic signals of respective parts of a flipflop circuit 13 are as shown in line "S" of the following Table and when the up-switch 11 is freed (contact R is closed), logic signals of the respective parts are reversed as shown in line "R" of the following Table.

|   | F1 | F2 | F3 | F4 | F5 | F6 |
|---|----|----|----|----|----|----|
| S | 0  | 0  | 1  | 1  | 0  | 1  |
| R | 1  | 1  | 0  | 0  | 1  | 0  |

Accordingly, every time the up-switch 11 is depressed, a logic signal of "1" is fed out from point F6 of the flipflop circuit 13. This signal and an output signal (ordinarily "1") of a NAND circuit 17, described hereinafter, are put into a NAND circuit 14, and a logic signal of "0" is fed out from the NAND circuit 14 and put into a count-up terminal of an up-down counter 20.

Similarly, every time the down-switch 12 is depressed, a logic signal of "1" is fed out from a flipflop circuit 15 and this signal and an output signal (ordinarily "1") of a NAND circuit 19, described hereinafter, are put into a NAND circuit 16 and a logic signal of "0" is fed out from the NAND circuit 16. This logic signal is put into a count-down terminal of the up-down counter 20.

The up-down counter 20 has output terminals A, B, C and D feeding out the numerical values of 0 to 9 according to BCD (binary-coded-decimal) system as shown in the following Table.

|   | A | B | C | D |   | A | B | C | D |
|---|---|---|---|---|---|---|---|---|---|
| 0 | 0 | 0 | 0 | 0 | 5 | 1 | 0 | 1 | 0 |
| 1 | 1 | 0 | 0 | 0 | 6 | 0 | 1 | 1 | 0 |
| 2 | 0 | 1 | 0 | 0 | 7 | 1 | 1 | 1 | 0 |
| 3 | 1 | 1 | 0 | 0 | 8 | 0 | 0 | 0 | 1 |
| 4 | 0 | 0 | 1 | 0 | 9 | 1 | 0 | 0 | 1 |

The up-down counter 20 is arranged so that the logic signal of "1" is put into a load terminal of the up-down counter 20 during a period of from the point when the power source switch 10 is closed to the point when a condenser C1 is charged by electric current from power source switch 10 and a transistor Tr1 becomes ON, and that simultaneously when the power source switch 10 is closed, logic signals of "1", "0", "1" and "0" are put into input terminals A, B, C and D of the up-down counter 20, respectively.

By virtue of this arrangement, while the power source switch 10 is closed and the logic signal of "1" is put into the load terminal of the up-down counter 20, the up-down counter 20 is not actuated (because the input to the count-up terminal and count-down terminal is changed to "1" at the moment when the power source switch 10 is closed), and after the input to the load terminal is changed to "0", by the above-mentioned signals put into the input terminals A, B, C and D, the numerical value of 5 according to BCD system is fed out from the output terminals A, B, C and D (A=1, B=0, C=1 and D=1).

Every time the depressed up-switch 11 is freed, that is, the logic signal of "0" put into the count-up terminal of the up-down counter 20 is changed to "1", the signals fed out from the output terminals A, B, C and D is changed from "n" according to BCD system to "n+1" according to BCD system. Every time the depressed down-switch 12 is freed, that is, the logic signal of "0" put into the count-down terminal of the up-down counter 20 is changed to "1", the signals fed out from the output terminals A, B, C and D are changed from "n" according to BCD system to "n−1" according to BCD system.

The above-mentioned arrangement may be modified so that at the moment when the switch is depressed, that is, the input is changed from "1" to "0", the output is changed.

The output terminals A, B, C and D of the up-down counter 20 are connected to input terminals A, B, C and D of a BCD-to-7 segment decoder 21 and also to input terminals A, B, C and D of a BCD-to-decimal decoder 22.

The BCD-to-7 segment decoder 21 feeds out logic signals as shown in the following Table from output terminals a, b, c, d, e, f and g according to a signal of 0 to 9 according to BCD system from the output terminals A, B, C and D of the up-down counter 20, whereby the 7-segment indicator 32 connected to the BCD-to-7 segment decoder 21 is actuated to display a numerical value of 0 to 9.

|   | a | b | c | d | e | f | g |
|---|---|---|---|---|---|---|---|
| 0 | 1 | 1 | 1 | 1 | 1 | 1 | 0 |
| 1 | 0 | 1 | 1 | 0 | 0 | 0 | 0 |
| 2 | 1 | 1 | 0 | 1 | 1 | 0 | 1 |
| 3 | 1 | 1 | 1 | 1 | 0 | 0 | 1 |
| 4 | 0 | 1 | 1 | 0 | 0 | 1 | 1 |
| 5 | 1 | 0 | 1 | 1 | 0 | 1 | 1 |
| 6 | 1 | 0 | 1 | 1 | 1 | 1 | 1 |
| 7 | 1 | 1 | 1 | 0 | 0 | 0 | 0 |
| 8 | 1 | 1 | 1 | 1 | 1 | 1 | 1 |
| 9 | 1 | 1 | 1 | 1 | 0 | 1 | 1 |

The output terminals A and D of the up-down counter 20 are connected to the NAND circuit 17, and an output terminal of the NAND circuit 17 is connected to one input terminal of the NAND circuit 14. Accordingly, when both signals on the output terminals A and D of the up-down counter 20 are "1" (9 according to BCD system), the output of the NAND circuit 14 is "0" and even when the up-switch 11 is depressed, the output of the NAND circuit 14 is held at "1" and the up-down counter 20 is not actuated.

The output terminal d of the BCD-to-7 segment decoder 21 is connected directly to the NAND circuit 19, and the output terminal g of the decoder 21 is connected to the NAND circuit 19 through a NAND circuit 18. The NAND circuit 19 is connected to one input terminal of the NAND circuit 16. Accordingly, when the signal on the output terminal d is "1" and the signal on the output terminal g is "0" (0 according to BCD system), the output of the NAND circuit 19 is "0" and even when the down-switch 12 is depressed, the output of the NAND circuit 16 is held at "1" and the up-down counter 20 is not actuated.

The BCD-to-decimal decoder 22 has output terminals 0 to 9 and according to the signal of n according to BCD system (n=0 to 9) from the output terminals A, B, C and D of the up-down counter 20, a logic signal of "1" is fed out from the corresponding output terminal n of the decoder 22.

When the logic signal of "1" is fed out from the output terminal n (n=0 to 9), a constant voltage determined by a zener diode Dz is divide by a temperature setting resistor Rn (n=0 to 9) and a resistor Ra, and the divided voltage at the point X1 is put into an input terminal on the positive (+) side of an operational amplifier P1. Namely, one of ten temperature setting resistors R0 to R9 (the resistance values are arranged so that the relation of R0<R1< .. <R8<R9 is established) is selected. As the number n of the output terminal feeding out the signal of "1" is increased, the resistance value of the temperature setting resistor is increased and the divided voltage at the point X1 is decreased, with the result that the output voltage of the operational amplifier P1 is reduced. In this zone, the digital-analog conversion is performed.

The output voltage of the operational amplifier P1 is divided by resistors Rc and Rd (when transistor Tr2 becomes OFF), and the divided voltage at point X2 is put as the signal of the temperature setting circuit into an input terminal on the positive (+) side of an operational amplifier P2 of the control amplifier 9.

Reference numerals 23 and 24 represent an electromagnetic clutch for actuating a compressor of the cooler and a control switch for the electromagnetic clutch 23, respectively, and they are arranged so that when the control switch 24 is closed at the time of cooling mode the transistor Tr2 becomes ON to bypass the resistor Rd and even if the output voltage of the operational amplifier P1 is the same, the divided voltage at the point X2 is slightly decreased.

The divided voltage at point X3 obtained by dividing a constant voltage determined by a zener diode Dz by a resistor Re and a thermistor TH as the temperature detecting resistor is put into an input terminal on the negative (−) side of the operational amplifier P2 through a resistor Rf. The thermistor TH is diposed to detect the temperature of the car chamber and is arranged so that as the temperature of the car chamber is elevated, the resistance value of the thermistor TH is decreased and the divided voltage at the point X3 is reduced.

The operational amplifier P2 compares the voltage at the point X2 on the temperature setting side with the voltage at the point X3 on the temperature detecting side and amplifies the result of the comparison operation, and the output current of the operational amplifier P2 is put into an input terminal on the positive (+) side of an operational amplifier P3. The operational amplifier P3 is disposed to stabilize the current to the base terminal of a transistor Tr3. The output current of the operational amplifier P3 is introduced to the base terminal of the transistor Tr3 to control the value of the current flowing to the emitter terminal from the collector terminal in the transistor Tr3.

The transducer 8 is connected to the emitter terminal of the transistor Tr3, so that when the value of the current flowing to the emitter terminal from the collector terminal in the transistor Tr3 is increased or decreased, the value of the current flowing through the transducer 8 is increased or decreased.

The operation of the temperature control apparatus having the above-mentioned structure will now be described.

When the power source switch 10 is closed, the up-down counter 20 is set in such a state that a signal of 5 according to BCD system (A=1, B=0, C=1 and D=0) is fed out from the output terminals A, B, C and D of the up-down counter 20. As a result, a logic signal of "1" appears on each of the output terminals a, c, d, f and g of the BCD-to-7 segment decoder 21 and the 7-segment indicator 32 displays a numerical value of 5. Accordingly, the indicator 32 and the above-mentioned indicator 31 together indicate that the set temperature is 25° C. Incidentally, the indicator 31 is lit to display a numerical value of 2 when the power source switch 10 is closed.

The output of 5 according to the BCD system, which is fed out from the up-down counter 20, is also put into the BCD-to-decimal decoder 22, and a logic signal of "1" appears on the output terminal 5 of the decoder 22. The resistor R5 is selected as the temperature setting resistor for determining, together with the resistor Ra, the divided voltage at the point X1, which is put into the input terminal on the positive (+) side of the operational amplifier P1. Thus, the output voltage of the operational amplifier P1 is determined and the voltage on the positive (+) side of the operational amplifier P2 of the control amplifier 9 is maintained at a level corresponding to the set temperature of 25° C. (the determined set temperature).

In the case where the up-switch 11 is depressed in the above state, at the moment the depressed switch 11 is freed, the logic signal put into the count-up terminal of the up-down counter 20 is changed from "0" to "1" and at this moment, a signal of 6 according to BCD system (A=0, B=1, C=1 and D=1) is fed out from the output terminals A, B, C and D of the up-down counter 20. In this case, a logic signal of "1" appears on each of the output terminals a, c, d, e, f and g of the BCD-to-7 segment decoder 21, and a numerical value of 6 is displayed by the 7-segment indicator 32. Accordingly, the indicator 32 and the above-mentioned indicator 31 together indicate that the set temperature is 26° C. Simultaneously, a logic signal of "1" appears on the output terminal 6 of the BCD-to-decimal decoder 22 and the resistor R6 (R6>R5) is selected as the temperature setting resistor. As a result, the divided voltage at the point X1 is decreased and the output voltage of the operational amplifier P1 is reduced and therefore, the voltage on the positive (+) side of the operational amplifier P2 is also reduced to a level corresponding to the set temperature of 26° C.

When the up-switch 11 is further depressed, that is, for example, three successive times at each depressing, signals of 7, 8 and 9 according to BCD system are sequentially fed out from the output terminals A, B, C and D of the up-down counter 20 and the indicator 31 and 7-segment indicator 32 together display 27° C., 28° C. and 29° C. sequentially and the temperature setting resistors R7, R8 and R9 are sequentially selected. Thus, the output voltage of the operational amplifier P1 is reduced and the voltage on the positive (+) side of the operational amplifier P2 is reduced to levels corresponding to the set temperatures 27° C., 28° C., and 29° C., sequentially.

When the temperature is set at 29° C. (A=1, B=0, C=0 and D=1 on the output terminals of the up-down counter 20) the output of the NAND circuit 17 for holding the temperature elevation is "0", and even if the up-switch 11 is further depressed in this state, the output of the NAND circuit 14 is not changed and therefore, the up-down counter 20 is not actuated and the set temperature is maintained at 29° C. (the maximum set temperature).

If the down-switch 12 is depressed once in this state, the moment the switch 12 is freed, the signal to be put into the countdown terminal of the up-down counter 20 is changed from "0" to "1" and simultaneously, a signal of 8 according to BCD system (A=0, B=0, C=0 and D=1) is fed out from the output terminals A, B, C and D of the up-down counter 20. In this case, the indicator 31 and the 7-segment indicator 32 together display 28° C. and the temperature setting resistor R8 (R8<R9) is selected by the BCD-to-decimal decoder 22. As a result, the output voltage of the operational amplifier P1 is increased and the voltage on the positive (+) side of the operational amplifier P2 is elevated to a level corresponding to the set temperature 28° C.

When the down-switch 12 is further depressed, at every depressing, signals of 7, 6, 5, 4, 3, 2, 1 and 0 according to BCD system are sequentially fed out from the output terminals A, B, C and D of the up-down counter 20, and temperatures of 27° C., 26° C., 25° C., 24° C., 23° C., 22° C., 21° C. and 20° C. are sequentially displayed by the indicator 31 and the 7-segment indicator 32 and the temperature setting resistors R7, R6, R5, R4, R3, R2, R1 and R0 are sequentially selected by the BCD-to-decimal decoder 22, whereby the output voltage of the operational amplifier P1 is sequentially increased and the voltage on the positive (+) side of the operational amplifier P2 is sequentially elevated to levels corresponding to levels of 27° C., 26° C., 25° C., 24° C., 23° C., 22° C., 21° C. and 20° C.

When the temperature is set at 20° C. (a to f=1 and g=0 on the output terminals of the BCD-to-7 segment decoder 21), the output of the NAND circuit 19 for holding the temperature lowering is "0" and even if the down-switch 12 is further depressed in this state, the output of the NAND circuit 16 is not changed and therefore, the up-down counter 20 is not actuated and the set temperature is maintained at 20° C. (the minimum set temperature).

As will be apparent from the above explanation, an optional set temperature of 20° to 29° C. can be freely selected by appropriately operating the up-switch 11 and the down-switch 12.

The control of the temperature to a set level (20° to 29° C.) will now be described.

When the temperature of the car chamber is lowered below the set level (or the set level is elevated), the resistance value of the thermistor TH is increased and the voltage on the negative (−) side of the operational amplifier P2 is increased (or, the resistance value is increased by selection of one of the temperature setting resistors R1 to R9 and the voltage on the positive (+) side of the operational amplifier P2 is decreased). The operational amplifier P2 compares the voltage on the positive (+) side with the voltage on the negative (−) side and amplifies the result of the comparison operation. Since the voltage on the positive (+) side is lower than the voltage on the negative (−) side in the operational amplifier P2, the output of the amplifier P2 is decreased. The output current from the operational amplifier P2 is put into the operational amplifier P3, and a stable output current from the operational amplifier P3 is supplied to the base terminal of the transistor Tr3 to control the value of the current flowing from the collector terminal to the emitter terminal. In this case, since the output current from the operational amplifier P2 is decreased, the output current from the operational amplifier P3 is also decreased and the current flowing from the collector terminal to the emitter terminal in the transistor Tr3 is similarly reduced. As a result, the current flowing through the transducer 8 is decreased to increase the output negative pressure of the transducer 8, whereby the air mixing door 6 is operated to the hot side by the negative pressure actuator 7 and the temperature of the car chamber is elevated to the set level.

When the temperature of the car chamber is elevated above the set level (or the set level is reduced), the operations are performed in a manner quite contrary to the manner described above and the current flowing through the transducer 8 is increased. As a result, the output negative pressure of the transducer 8 is reduced and by the negative pressure actuator 7, the air mixing door 6 is operated to the cold side to lower the temperature of the car chamber to the set level.

Incidentally, at the time of the cooling mode when the compressor of the cooler is actuated, since the control switch 24 is closed, a current flows through the transistor Tr2 to bypass the resistor Rd, whereby the voltage on the positive (+) side of the operational amplifier P2 is slightly reduced even if the set level of the temperature (the output of the operational amplifier P1) is the same and the influence of the on-off operation of the compressor is corrected.

As will be apparent from the foregoing explanation, according to the present invention, the temperature can be set very simply and known very easily.

What is claimed is:

1. A temperature control apparatus for controlling air temperature in an air conditioner for an automobile including:

- a temperature setting circuit for generating a signal indicative of a temperature set by manual operation, said temperature setting circuit having a manual operating means for setting air temperature;
- a temperature detecting circuit for generating a signal indicative of an actual air temperature in the air conditioner, said temperature detecting circuit being arranged so as to detect the air temperature;
- a control amplifier for comparing the signal from said temperature setting circuit with the signal from said temperature detecting circuit and generating a signal according to the result of the comparison; and
- an actuater for opening or closing an air mixing door, said actuater being operated according to the signal from said control amplifier, said air mixing door being arranged so as to control air temperature by adjusting the mixing ratio of a heated air flow rate with a cooled air flow rate,
- wherein an improvement is characterized in that said temperature setting circuit comprises
- two self-return type push button switches operating as said manual operating means, one of said switches for elevating and the other of said switches for lowering the set temperature,
- an up-down counter for counting signals from said switches and feeding out a digital signal, and
- a digital-analog converting circuit for carrying out a digital-analog conversion of the output of said up-down counter to generate a signal to be put into said control amplifier,
- said temperature control apparatus further comprises an indicator means for receiving said output of said up-down counter and digitally and visually displaying said set temperature.

2. A temperature control apparatus according to claim 1, wherein said control amplifier is arranged so as to be supplied with a first electric voltage as said signal from said temperature setting circuit and with a second electric voltage as said signal from said temperature detecting circuit, said first electric voltage being a divided voltage determined by a resistor and one of temperature setting resistors having different resistance values, respectively, and said second electric voltage being a divided voltage determined by a resistor and a thermistor, and wherein said digital-analog converting circuit is arranged so as to select one of said temperature setting resistors according to the output of said up-down counter through a diode switch circuit.

3. A temperature control apparatus according to claim 1 or 2, wherein said indicator means is a 7-segment indicator connected to said up-down counter through a converter for 7-segment.

4. A temperature control apparatus according to claim 1 wherein said up-down counter is arranged so that said counter is preset to feed out the digital signals indicative of a predetermined set temperature at the moment when a power source switch of the air conditioner is closed.

5. A temperature control apparatus according to claim 1 or 4, wherein said up-down counter is arranged so as not to change the digital signal at the time of operating said switch for elevating the set temperature when said counter is set to feed out the digital signal indicative of a predetermined maximum set temperature and at the time of operating said switch for lowering the set temperature when said counter is set to feed out the digital signal indicative of a predetermined minimum set temperature.

6. A temperature control apparatus for controlling air temperature in an air conditioner for an automobile comprising:

two self-return type push button switches operating as a manual operating means for setting air temperature, one of said switches for elevating and the other of said switches for lowering the set temperature;

an up-down counter for counting signals from said switches and feeding out a digital signal;

a digital-analog converting circuit for carrying out a digital-analog conversion of the output of said up-down counter to generate a signal indicative of said set temperature;

a temperature detecting circuit for generating a signal indicative of an actual air temperature in the air conditioner, said temperature detecting circuit being arranged so as to detect the air temperature;

a control amplifier for comparing the signal from said digital-analog converting circuit with the signal from said temperature detecting circuit and generating a signal according to the result of the comparison;

an actuater for opening or closing an air mixing door, said actuater being operated according to the signal from said control amplifier, said air mixing door being arranged so as to control air temperature by adjusting the mixing ratio of a heated air flow rate with a cooled air flow rate; and an indicator means for receiving said output of said up-down counter and digitally and visually displaying said set temperature.

7. A temperature control apparatus according to claim 6, wherein said control amplifier is arranged so as to be supplied with a first electric voltage as said signal from said digital-analog converting circuit and with a second electric voltage as said signal from said temperature detecting circuit, said first electric voltage being a divided voltage determined by a resistor and one of temperature setting resistors having different resistance values, respectively, and said second electric voltage being a divided voltage determined by a resistor and a thermistor, and wherein said digital-analog converting circuit is arranged so as to select one of said temperature setting resistors according to the output of said up-down counter through a diode switch circuit.

8. A temperature control apparatus according to claim 6 or 7, wherein said indicator means is a 7-segment indicator connected to said up-down counter through a converter for 7-segment.

9. A temperature control apparatus according to claim 8, wherein said up-down counter is arranged so that said counter is preset to feed out the digital signal indicative of a predetermined set temperature at the moment when a power source switch of the air conditioner is closed.

10. A temperature control apparatus according to claim 9, wherein said up-down counter is arranged so as not to change the digital signal at the time of operating said switch for elevating the set temperature when said counter is set to feed out the digital signal indicative of a predetermined maximum set temperature and at the time of operating said switch for lowering the set temperature when said counter is set to feed out the digital signal indicative of a predetermined minimum set temperature.

* * * * *